United States Patent
Zhang et al.

(10) Patent No.: US 12,331,784 B2
(45) Date of Patent: Jun. 17, 2025

(54) CROSSHEAD PART AND CROSSHEAD SYSTEM FOR DRILLING PUMPS AND THE DRILLING PUMPS

(71) Applicant: SICHUAN HONGHUA PETROLEUM EQUIPMENT CO., LTD, Sichuan (CN)

(72) Inventors: Fangfang Zhang, Sichuan (CN); Weili Huang, Sichuan (CN); Jian Cheng, Sichuan (CN); Qiong Yang, Sichuan (CN)

(73) Assignee: SICHUAN HONGHUA PETROLEUM EQUIPMENT CO., LTD, Sichuan (CN)

( * ) Notice: Subject to any disclaimer, the term of this patent is extended or adjusted under 35 U.S.C. 154(b) by 172 days.

(21) Appl. No.: 18/120,986

(22) Filed: Mar. 13, 2023

(65) Prior Publication Data

US 2023/0213065 A1    Jul. 6, 2023

(30) Foreign Application Priority Data

Mar. 15, 2022   (CN) .......................... 202220561530.3

(51) Int. Cl.
F16C 33/10     (2006.01)
F04B 53/14     (2006.01)
F04B 53/18     (2006.01)

(52) U.S. Cl.
CPC .......... *F16C 33/1045* (2013.01); *F04B 53/14* (2013.01); *F04B 53/18* (2013.01); *F16C 2360/42* (2013.01)

(58) Field of Classification Search
CPC ...... F04B 1/0439; F04B 53/14; F04B 53/146; F04B 53/18; F16C 5/00; F16C 33/1045
See application file for complete search history.

(56) References Cited

FOREIGN PATENT DOCUMENTS

| CN | 208651416 U | * | 3/2019 | ............ F04B 39/00 |
| CN | 112412777 A | * | 2/2021 | ............ F04B 53/18 |
| CN | 214945696 U | * | 11/2021 | |
| WO | WO-2013163787 A1 | * | 11/2013 | ............ F04B 53/14 |

* cited by examiner

*Primary Examiner* — Thomas E Lazo

(57) ABSTRACT

A crosshead part for drilling pumps includes an upper guide plate, a lower guide plate and a crosshead, wherein the crosshead reciprocates in a straight line between the upper guide plate and the lower guide plate; at least one of the upper and lower guide plates has an oil inlet for introducing external lubricating oil between the at least one of the upper and lower guide plates and an arc surface of the crosshead. A crosshead system for drilling pumps includes a lubricating pipeline system and the crosshead part. The lubricating pipeline system includes a main pipeline and N branch pipelines. A drilling pump includes the crosshead part or the crosshead system.

15 Claims, 6 Drawing Sheets

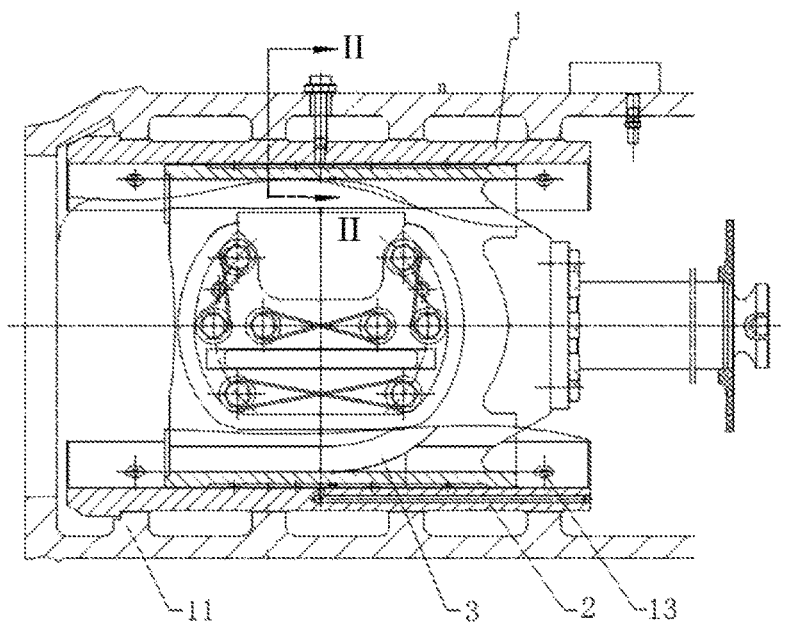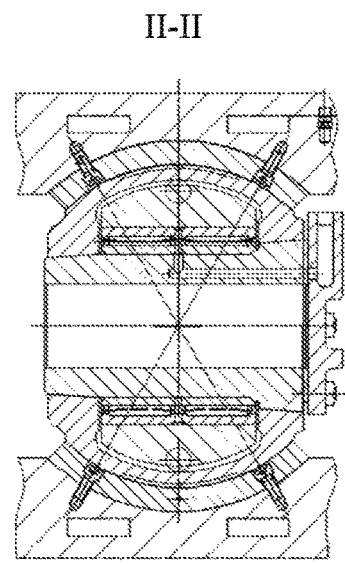
Fig. 1            Fig. 2
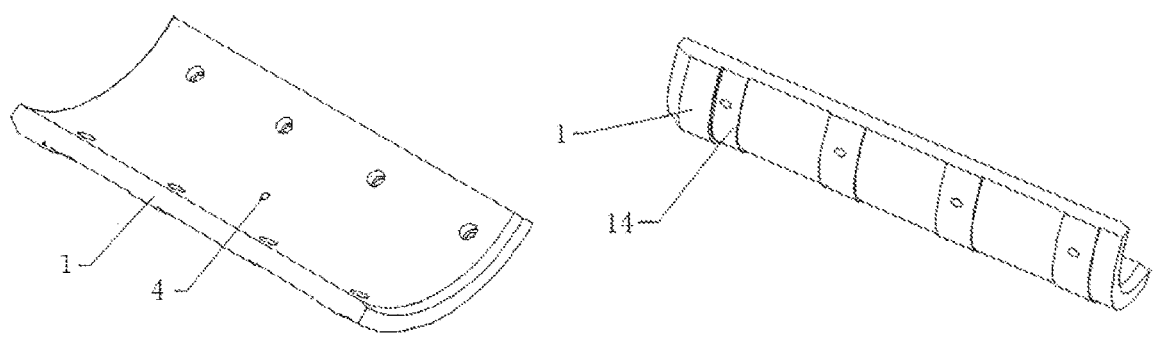
Fig. 3A            Fig. 3B

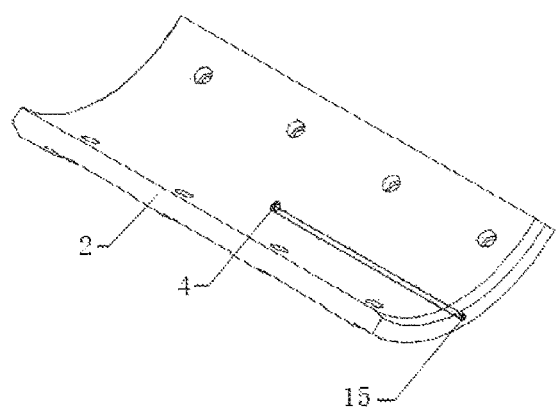
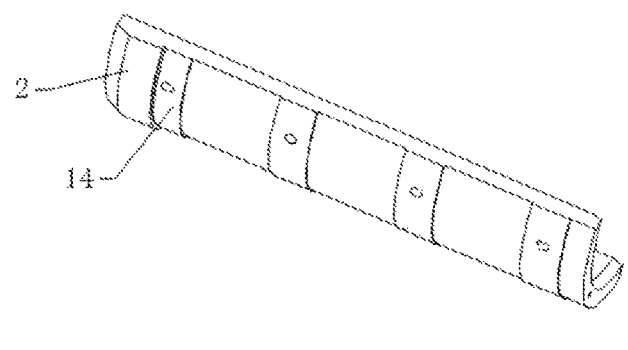
Fig. 4A　　　　　　　　　　Fig. 4B
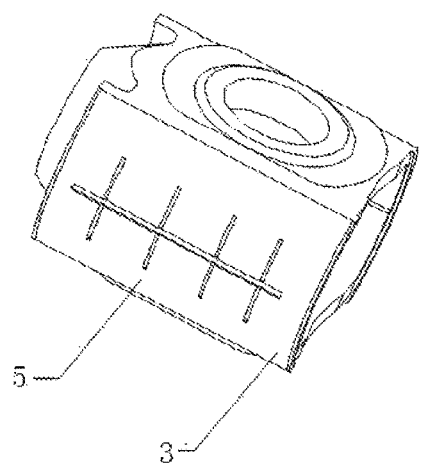
Fig. 5
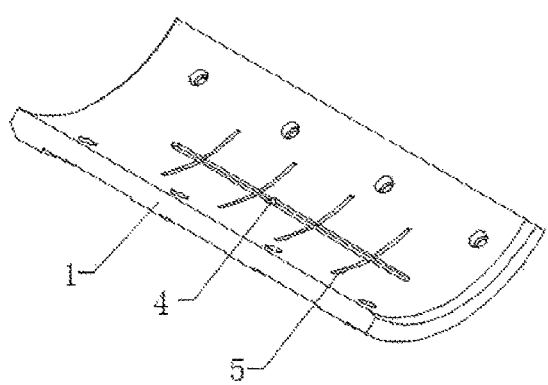
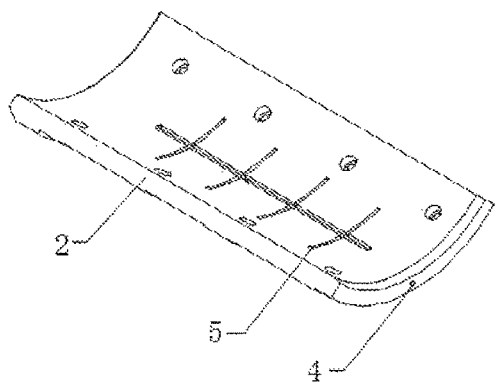
Fig. 6A　　　　　　　　　　Fig. 6B

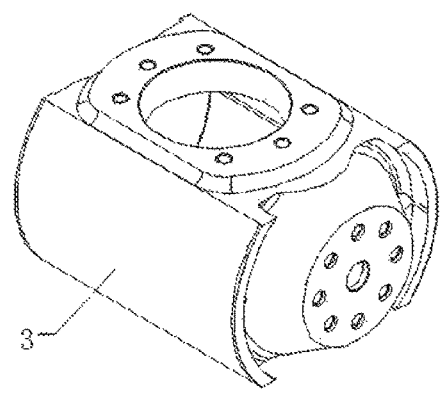
Fig. 6C
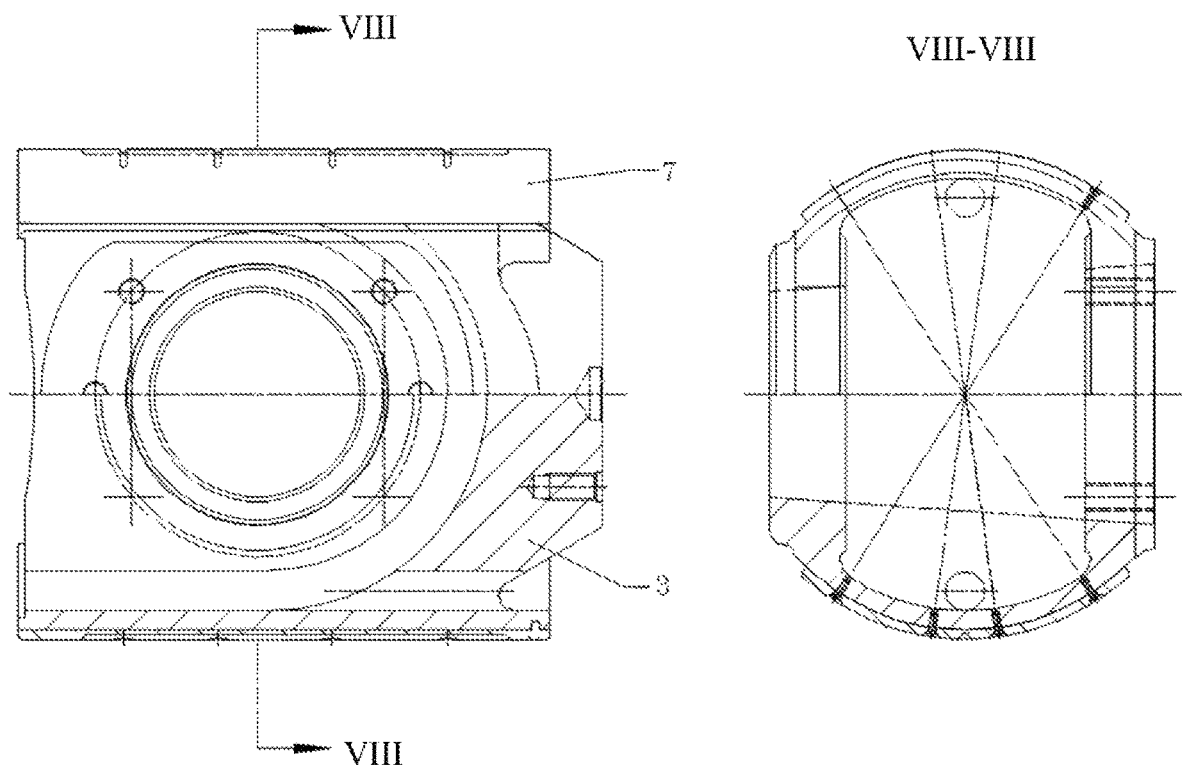
Fig. 7
Fig. 8

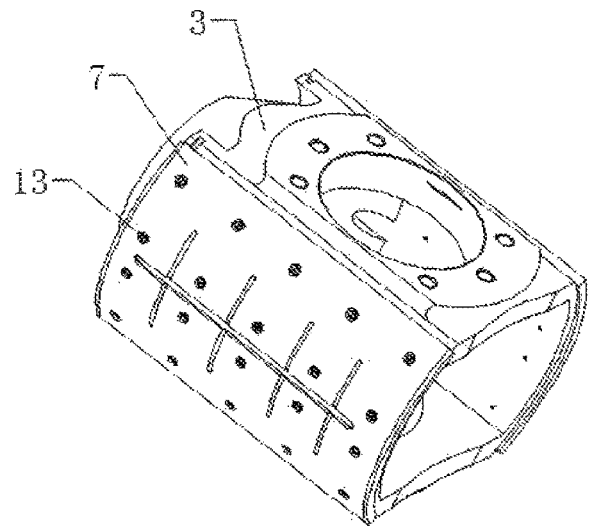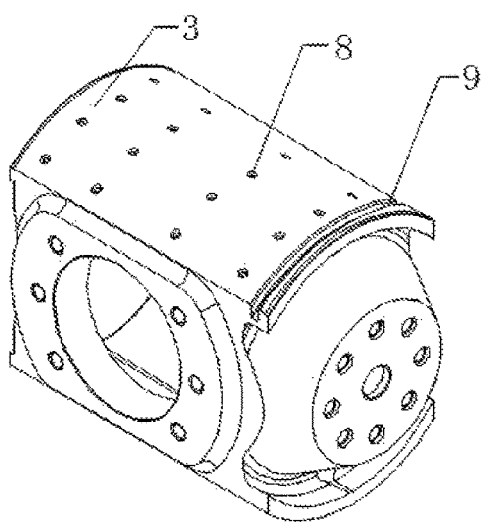
Fig. 9A  Fig. 9B
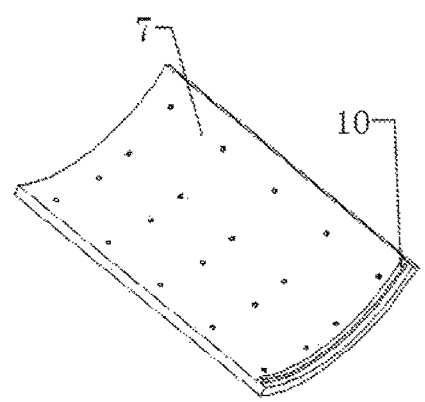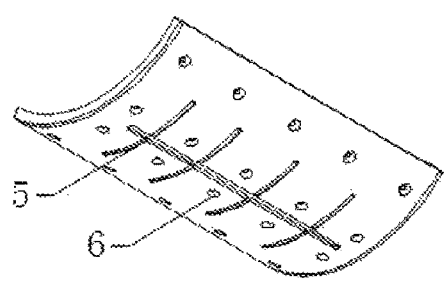
Fig. 9C  Fig. 9D

CROSSHEAD PART AND CROSSHEAD SYSTEM FOR DRILLING PUMPS AND THE DRILLING PUMPS

CROSS REFERENCE OF RELATED APPLICATION

The present invention claims priority under 35 U.S.C. 119(a-d) to CN 202220561530.3, filed Mar. 15, 2022.

BACKGROUND OF THE PRESENT INVENTION

Field of Invention

The present invention relates to the technology field of parts of drilling pumps, and more particularly to a crosshead part and a crosshead system for drilling pumps and a drilling pump.

Description of Related Arts

Drilling pumps are widely used in the petroleum industry and are the core components of drilling rigs. The crosshead part is the most important transmission part in the drilling pump, which performs linear reciprocating motion. Due to the harsh working environment and working conditions of the drilling pump, the crosshead part is required to have high reliability, but in actual use, the crosshead part is often the most easily damaged part. The reasons are as follows.
(1) When assembling the crosshead part, it is necessary to install a gasket between the guide plate and the support ribs of the frame guide plate, so the installation quality of the crosshead part is greatly affected by human factors.
(2) Because the guide plate of the crosshead part is installed by a small fixed plate through the frame support rib, and then connected to the fixed plate by bolts, the rest of the guide plate is suspended, resulting in local deformation of the guide plate, and the contact area between the guide plate and the crosshead is poor.
(3) Due to the requirements of the installation structure, the distribution between the support ribs of the guide plate in the frame part is uneven, resulting in no support in the middle of the guide plate, resulting in deformation.
(4) The materials are poor in compatibility.
(5) The lubrication between the lower guide plate and the crosshead part is oil drip lubrication, and the lubrication is not sufficient.

In view of the above situation, it is necessary to design a new crosshead part and a lubrication system to ensure the reliability of the crosshead part.

SUMMARY OF THE PRESENT INVENTION

A technical problem to be solved by the present invention is that the lubrication between the upper and lower guide plates and the crosshead is insufficient.

To solve the above technical problem, the present invention provides technical solutions as follows.

A crosshead part for drilling pumps comprises an upper guide plate, a lower guide plate and a crosshead, wherein the crosshead reciprocates in a straight line between the upper guide plate and the lower guide plate; at least one of the upper and lower guide plates has an oil inlet for introducing external lubricating oil between the at least one of the upper and lower guide plates and an arc surface of the crosshead.

Preferably, an oil groove is provided at one plate surface of the at least of the upper and lower guide plates which faces towards the crosshead, and the oil inlet is communicated with the oil groove; or an oil groove is provided at the arc surface of the crosshead, and the oil inlet is communicated with the oil groove.

Preferably, the oil groove is a star-shaped oil groove.

Preferably, both the upper and lower guide plates are made from vermicular cast iron, the crosshead is made from isothermal ductile iron, and a difference in hardness is formed between the upper and lower guide plates and the crosshead.

Preferably, the vermicular cast iron is RuT350 or RuT400 vermicular cast iron, the isothermal ductile iron is QTD900-8 isothermal ductile iron.

Preferably, the crosshead part further comprises a sliding-shoe which is installed on the arc surface of the crosshead, wherein the sliding-shoe has an oil inlet for introducing external lubricating oil between the at least one of the upper and lower guide plates and the sliding-shoe; an oil groove is provided at an external surface of the sliding-shoe, the oil inlet is communicated with the oil groove.

More preferably, the crosshead part further comprises two sliding-shoes which are installed on the arc surface of the crosshead, wherein one of the sliding-shoes, which is installed on the arc surface of the crosshead, is corresponding to the upper guide plate; another of the sliding-shoes, which is installed on the arc surface of the crosshead, is corresponding to the lower guide plate. Based on lubrication requirements, the oil inlet is able to be provided on at least one of the two sliding-shoes.

For the design of the position of the oil inlet, when there is no sliding-shoe, the oil inlet is provided on at least one of the upper and lower guide plates; when the crosshead part comprises the sliding-shoe, the oil inlet is able to be provided on at least one of the upper and lower guide plates and the sliding-shoe.

Preferably, the sliding-shoe is fixedly connected with the crosshead through bolts via threaded holes. More preferably, the sliding-shoe is fixedly connected with the crosshead through engaging a positioning groove with a positioning boss.

Preferably, the upper and lower guide plates and the crosshead are made from isothermal ductile iron, the sliding-shoe is made from copper alloy, and there is a difference in hardness between the upper and lower guide plates and the sliding-shoe.

Preferably, mounting surfaces of the upper and lower guide plates are fixed to support ribs on a frame through bolts, and an axis of the bolts is vertical to and passes through a central line of the crosshead.

Preferably, the support ribs are evenly distributed along an axial direction of the crosshead on the frame.

Also, the present invention provides a crosshead system for drilling pumps. The crosshead system comprises a lubricating pipeline system and the crosshead part mentioned above, wherein the lubricating pipeline system comprises a main pipeline and N branch pipelines (N is a positive integer ≥1), wherein an input end of the main pipeline is connected with an external lubricating oil supply system, one end of each of the branch pipelines is connected with the main pipeline, another end of the each of the branch pipelines is connected with the oil inlet. Based on actual lubrication requirements, the another end of the each of the branch pipelines is connected with at least one of the oil inlet on the upper guide plate, the lower guide plate and the sliding-shoe.

Also, the present invention provides a drilling pump which comprises the crosshead part or the crosshead system mentioned above.

The present invention has some advantages and beneficial effects as follows.

(1) The present invention is beneficial to completely solve the problems of eccentric wear of the crosshead and the strain of the guide plates and the crosshead.

(2) The present invention adopts the forced lubrication between the crosshead and the guide plates, and the lubrication of the crosshead part is able to be independent or integrated with the lubrication system of the drilling pump.

According to the present invention, in the case of no sliding-shoes, the upper and lower guide plates are made from RuT350 or RuT400 with better abrasion resistance, better thermal conductivity, and self-lubricating effect; the crosshead is made from QTD900-8 with higher hardness, so that there is a difference in hardness between the upper and lower guide plates and the crosshead. In the case of sliding-shoes, the upper and lower guide plates are made of QTD1050-6 with higher hardness, the crosshead part comprises the crosshead and sliding-shoes, the crosshead is made from QTD900-8 with higher hardness for ensuring the stiffness, the sliding-shoes are made from copper alloy with good friction reduction and good abrasion resistance, the copper alloy is low in hardness, so that there is a difference in hardness between the upper and lower guide plates and the sliding-shoes.

According to the present invention, the positioning reference plane of the upper and lower guide plates is the support ribs on the frame, the upper and lower guide plates are directly connected by bolts, an axis of the bolts is vertical to and passes through the central line of the crosshead, so as to avoid the deformation of the guide plates when the bolts are tightened. The support ribs are evenly distributed on the frame for evenly supporting the upper and lower guide plates. Therefore, during use, the guide plates have little deformation. This structure is especially suitable for drilling pumps with the high power of 2000 HP and above. Without changing the peripheral interface, the present invention is able to achieve the purpose of upgrading the existing 1600 HP drilling pump to 2000 HP drilling pump.

BRIEF DESCRIPTION OF THE DRAWINGS

The accompanying drawings described herein are used to provide a further understanding of the embodiments of the present invention, constitute a part of the present application, and do not constitute a limitation to the embodiments of the present invention.

FIG. 1 is an axially cross-sectional schematic diagram of a crosshead part (without sliding-shoes) for drilling pumps.

FIG. 2 is a sectional view of FIG. 1 along II-II.

FIG. 3A is a structural schematic diagram of a lower guide plate of the crosshead part (without oil grooves) from a certain perspective.

FIG. 3B is a structural schematic diagram of the lower guide plate of the crosshead part (without oil grooves) from another certain perspective.

FIG. 4A is a structural schematic diagram of an upper guide plate of the crosshead part (without oil grooves) from a certain perspective.

FIG. 4B is a structural schematic diagram of the upper guide plate of the crosshead part (without oil grooves) from another certain perspective.

FIG. 5 is a structural schematic diagram of a crosshead (with an oil groove).

FIG. 6A is a structural schematic diagram of an upper guide plate of a crosshead part (wherein the upper and lower guide plates are provided with oil grooves respectively, the crosshead has no oil groove).

FIG. 6B is a structural schematic diagram of a lower guide plate of the crosshead part (wherein the upper and lower guide plates are provided with oil grooves respectively, the crosshead has no oil groove).

FIG. 6C is a structural schematic diagram of a crosshead of a crosshead part (wherein the upper and lower guide plates are provided with oil grooves respectively, the crosshead has no oil groove).

FIG. 7 is an axially cross-sectional schematic diagram of a crosshead part (with sliding-shoes) for drilling pumps.

FIG. 8 is a sectional view of FIG. 7 along VIII-VIII.

FIG. 9A shows the crosshead is engaged with the sliding-shoes.

FIG. 9B shows the crosshead.

FIG. 9C is a structural schematic diagram of the sliding-shoe of the crosshead part (with sliding-shoes) from one certain perspective.

FIG. 9D is a structural schematic diagram of the sliding-shoe of the crosshead part (with sliding-shoes) from another certain perspective.

Figure 10:
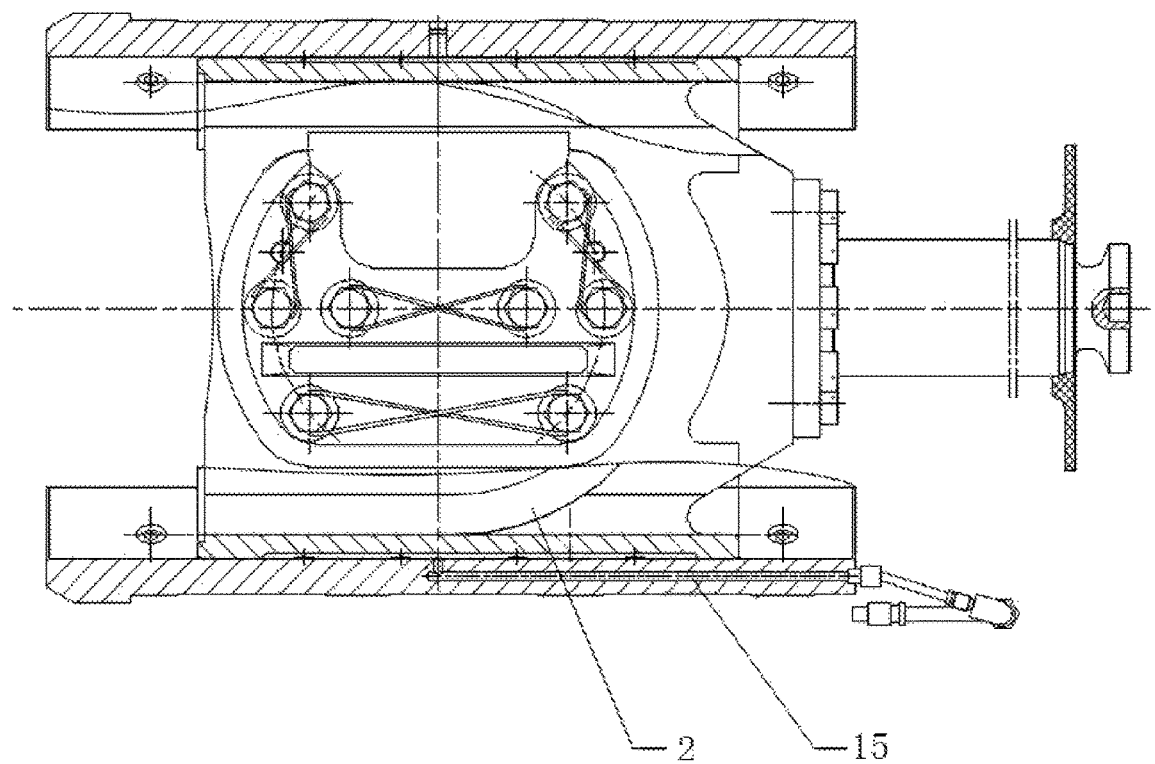
FIG. 10 is a cross-sectional view of the crosshead (with a lubricating structure).

In the drawings, 1: upper guide plate; 2: lower guide plate; 3: crosshead; 4: oil inlet; 5: oil groove; 6: installation through-hole; 7: sliding-shoe; 8: threaded hole; 9: positioning groove; 10: positioning boss; 11: frame; 12: support rib; 13: bolt; 14: mounting surface; 15: branch pipeline; 16: main pipeline; 17: lubrication system.

DETAILED DESCRIPTION OF THE PREFERRED EMBODIMENT

In order to make the objectives, technical solutions and advantages of the present invention clearer, the present invention will be further described in detail with reference to the drawings and embodiments as follows. The exemplary embodiments of the present invention are only used to explain the present invention, and are not intended to limit the present invention.

In the following descriptions, numerous specific details are set forth in order to provide a thorough understanding of the present invention. It is apparent, however, for those skilled in the art that these specific details are not necessary to implement the present invention. In other embodiments, the known structures, circuits, materials, or methods are not specifically described in order to avoid confusion of the present invention.

Throughout the specification, references to "one embodiment", "embodiments", "an example," or "examples" mean that a particular feature, structure, or characteristic described in connection with the embodiment or example is included in at least one embodiment of the present invention. Therefore, appearances of the phrases "one embodiment", "embodiments", "an example," or "examples" in various places throughout the specification do not all necessarily all refer to the same embodiment or example. Furthermore, the particular features, structures or characteristics may be combined in one or more embodiments or examples by any suitable combination and/or sub-combination. Moreover, those skilled in the art should understand that the drawings provided herein are for illustrative purposes and are not necessarily drawn to scale. The terms "and/or" include any and all combinations of one or more of related listed items.

In the description of the present invention, the orientation or positional relationship, indicated by the terms such as "front", "rear", "left", "right", "top", "bottom", "vertical", "horizontal", "high", "low", "inner" and "outer", is based on the orientation or positional relationship shown in the drawings, which is only for the convenience of describing the present invention and simplifying the description, rather than indicating or implying that the indicated device or element must have a specific orientation and must be constructed and operated in a particular orientation. Therefore, these terms should not be construed as limiting the protection scope of the present invention.

First Embodiment

A crosshead part for drilling pumps according to a first embodiment of the present invention is illustrated. The crosshead part comprises an upper guide plate 1, a lower guide plate 2 and a crosshead 3, wherein the crosshead 3 reciprocates in a straight line between the upper guide plate 1 and the lower guide plate 2; two oil inlets 4 are provided at a middle portion of the upper guide plate 1 and a middle portion of the lower guide plate 2 for introducing external lubricating oil between an internal surface of the upper guide plate 1 and an external arc surface of the crosshead 3, and between an internal surface of the lower guide plate 2 and the external arc surface of the crosshead 3 respectively.

Furthermore, two oil grooves 5 are provided at one plate surface of the upper guide plate 1 and one plate surface of the lower guide plate 2 both of which face towards the crosshead 3, for guiding the introduced lubricating oil, so as to fully disperse the introduced lubricating oil between the internal surface of the upper guide plate 1 and the external arc surface of the crosshead 3, and between the internal surface of the lower guide plate 2 and the external arc surface of the crosshead 3 respectively. The structural design of the oil grooves 5 only needs to meet the above requirements. Each of the oil grooves 5 has multiple channels communicating with each other. As shown in FIGS. 6A-6C, the oil grooves 5 form a star shape. The oil inlets 4 are communicated with the oil grooves 5 respectively. Since the oil inlets 4 and the oil grooves 5 are provided at the upper guide plate 1 or the lower guide plate 2, the oil inlets 4 are corresponding to the oil grooves 5 respectively, so that the lubricating oil is able to flow through every channel of the oil grooves 5.

Second Embodiment

A crosshead part for drilling pumps according to a second embodiment of the present invention is illustrated. The crosshead part comprises an upper guide plate 1, a lower guide plate 2 and a crosshead 3, wherein the crosshead 3 reciprocates in a straight line between the upper guide plate 1 and the lower guide plate 2; two oil inlets 4 are provided at a middle portion of the upper guide plate 1 and a middle portion of the lower guide plate 2 for introducing external lubricating oil between an internal surface of the upper guide plate 1 and an external arc surface of the crosshead 3, and between an internal surface of the lower guide plate 2 and the external arc surface of the crosshead 3 respectively.

Furthermore, two oil grooves 5 are provided at the external arc surface of the crosshead 3, for guiding the introduced lubricating oil, so as to fully disperse the introduced lubricating oil between the internal surface of the upper guide plate 1 and the external arc surface of the crosshead 3, and between the internal surface of the lower guide plate 2 and the external arc surface of the crosshead 3 respectively. The structural design of the oil grooves 5 only needs to meet the above requirements. Each of the oil grooves 5 has multiple channels communicating with each other. Referring to FIG. 5, the oil grooves 5 form a star shape. The oil inlets 4 are communicated with the oil grooves 5 respectively, so that the lubricating oil is able to flow through every channel of the oil grooves 5. One of the two oil inlets 4 is provided at the upper guide plate 1 for performing drip lubrication or forced lubrication on an upper portion of the crosshead 3, and another of the two oil inlets 4 is provided at the lower guide plate for performing forced lubrication on a lower portion of the crosshead 3.

Both the upper and lower guide plates 1, 2 are made from RuT350 or RuT400 vermicular cast iron with good wear resistance, good thermal conductivity and self-lubricating effect; the crosshead 3 is made from QTD900-8 isothermal ductile iron with high hardness, thereby ensuring that a difference in hardness is formed between the upper and lower guide plates 1, 2 and the crosshead 3.

Third Embodiment

A crosshead part for drilling pumps according to a third embodiment of the present invention is illustrated. The crosshead part comprises an upper guide plate 1, a lower guide plate 2 and a crosshead 3, wherein the crosshead 3 reciprocates in a straight line between the upper guide plate 1 and the lower guide plate 2; two oil inlets 4 are provided at a middle portion of the upper guide plate 1 and a middle portion of the lower guide plate 2 for introducing external lubricating oil between an internal surface of the upper guide plate 1 and an external arc surface of the crosshead 3, and between an internal surface of the lower guide plate 2 and the external arc surface of the crosshead 3 respectively.

The crosshead part further comprises two sliding-shoes 7 which are installed on the external arc surface of the crosshead 3. Each of the sliding-shoes 7 is also able to be provided with an oil inlet 4. The oil inlets 4 are for introducing the external lubricating oil between the upper guide plate 1 and one of the two sliding-shoes 7, and between the lower guide plate 2 and another of the two sliding-shoes 7 respectively. Two oil grooves 5 are provided on an external surface of the two sliding-shoes 7 respectively. The two oil inlets 4 are communicated with the two oil grooves 5 respectively. Here, the oil grooves 5 are configured to guide the introduced lubricating oil, so as to fully disperse the introduced lubricating oil between the external surface of one of the two sliding-shoes 7 and the upper guide plate 1, and between the external surface of another of the two sliding-shoes 7 and the lower guide plate 2 respectively.

When drip lubrication is required, one oil inlet 4 is provided on the upper guide plate 1. When forced lubrication is required, the upper guide plate 1 and the one of the two sliding-shoes 7 installed on the external arc surface of the crosshead 3 are able to be provided with the oil inlets 4;

any one of the lower guide plate 2 and the another of the two sliding-shoes 7 installed on the external arc surface of the crosshead 3 is also able to be provided with the oil inlet 4, so as to enhance the lubricating effect.

The structural design of the oil grooves 5 only needs to meet the above requirements. Each of the oil grooves 5 has multiple channels communicating with each other. Referring to FIGS. 9A-9D, the oil grooves 5 form a star shape. Since the two oil inlets 4 are communicated with the oil grooves 5, the lubricating oil is able to flow through every channel of the two oil grooves 5.

The two sliding-shoes 7 are fixedly connected with the crosshead 3 through bolts 13 via multiple threaded holes 8. The two sliding-shoes 7 are fixedly connected with the crosshead 3 through engaging two positioning grooves 9 with two positioning bosses 10 respectively. Each of the two sliding-shoes 7 has multiple installation through-holes 6. Each of the two positioning bosses 10 is provided at an internal surface of one end of the each of the two sliding-shoes 7. The external arc surface of the crosshead 3 have the threaded holes 8. The two positioning grooves 9 are provided at two ends of the external arc surface of the crosshead 3 respectively. Through the installation through-holes 6, the bolts are screwed into the threaded holes, the two positioning bosses 10 are engaged with the two positioning grooves 9 respectively, so that the two sliding-shoes 7 are detachably fixed on the external arc surface of the crosshead 3.

Both the upper and lower guide plates 1, 2 are made from QTD1050-6 isothermal ductile iron with high hardness. The crosshead 3 is made from QTD900-8 isothermal ductile iron with high hardness for ensuring the hardness. The two sliding-shoes 7 are made from copper alloy with good friction reduction and abrasion resistance. Moreover, the copper alloy is bad in hardness, so that there is a difference in hardness between the upper and lower guide plates 1, 2.

Fourth Embodiment

A crosshead part for drilling pumps according to a fourth embodiment of the present invention is illustrated, which is further improved based on any one of the first, second and third embodiments. Mounting surfaces 14 of the upper and lower guide plates 1, 2 are directly fixed on support ribs 12 on a frame 11 through bolts, and an axis of the bolts are vertical to and passes through a central line of the crosshead 3, which avoids the deformation of the upper and lower guide plates 1, 2. The support ribs 12 are evenly distributed along an axial direction of the crosshead 3 on the frame 11 for evenly supporting the upper and lower guide plates 1, 2, so that the deformation is reduced during use.

Fifth Embodiment

A crosshead system for drilling pumps according to a fifth embodiment of the present invention is illustrated. The crosshead system comprises a lubricating pipeline system and the crosshead part mentioned in the fourth embodiment. The lubricating pipeline system comprises a main pipeline 16 and multiple branch pipelines 15, wherein an input end of the main pipeline 16 is connected with an external lubricating oil supply system, one end of each of the branch pipelines 15, another end of the each of the branch pipelines 15 is connected with the oil inlet 4 of the upper guide plate 1, the lower guide plate 2, or the sliding-shoes 7.

Figure 11:
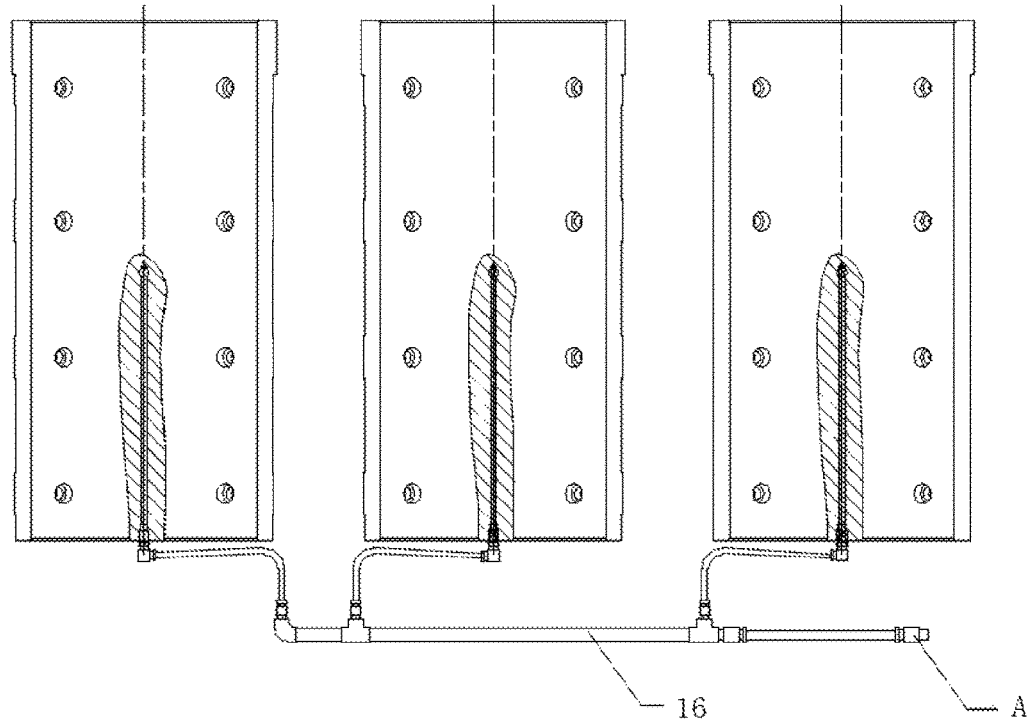
FIG. 11 is a structural schematic diagram of a lubricating oil pipeline system of the present invention.
Figure 12:
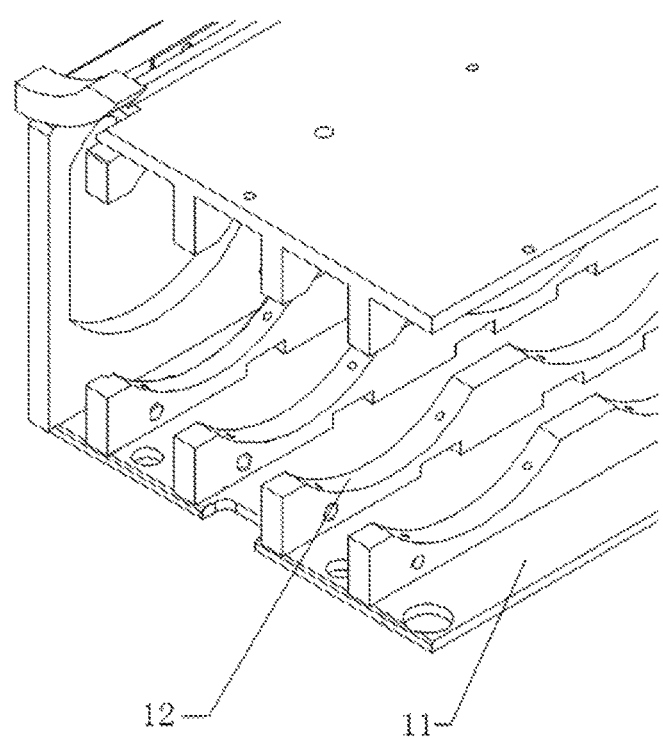
FIG. 12 is a structurally schematic diagram of a frame of the present invention.

As shown in FIG. 11, there are three branch pipelines 15 which are connected with the oil inlets 4 of the lower guide plate 2. The lubricating oil passes through the main pipeline 16 and the branch pipelines 15 in sequence, and flows into the oil grooves 5; an oil film is formed between the crosshead 3 (or the sliding-shoe 7) and the lower guide plate 2, which reduces friction and takes away heat. The lubricating pipeline system is able to be a separate system, or to be connected with a lubrication system 17 of the drilling pump.

Sixth Embodiment

Figure 13:
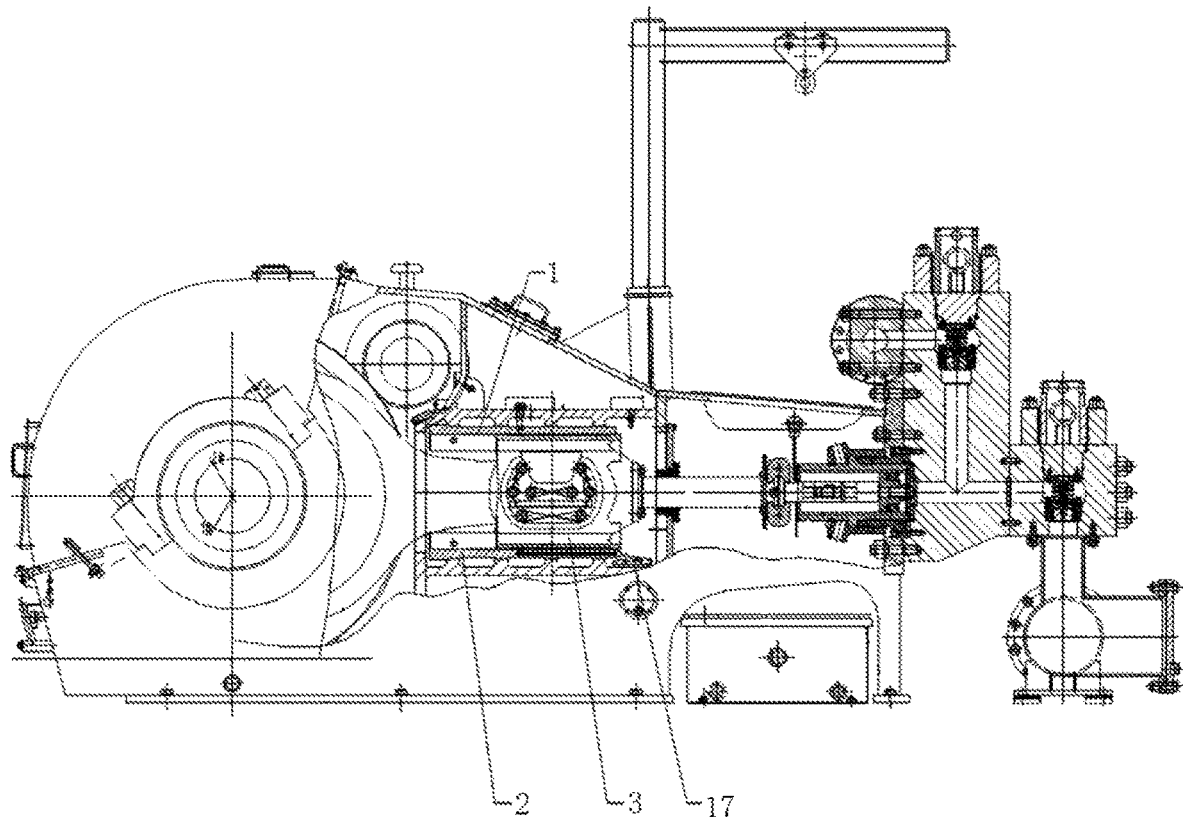
FIG. 13 is a drilling pump of the present invention.

Referring to FIG. 13, a drilling pump according to a sixth embodiment of the present invention is illustrated. The crosshead part of the drilling pump is able to be the crosshead part mentioned in the fourth embodiment, or the crosshead system mentioned in the fifth embodiment; the frame of the drilling pump is the frame 11 mentioned in the fifth embodiment.

The specific embodiments described above further explain the objectives, technical solutions and beneficial effects of the present invention in detail. It should be understood that the above are only specific embodiments of the present invention and are not intended to limit the protection scope of the present invention. Any modification, equivalent replacement, and improvements made within the spirit and principle of the present invention shall be included in the protection scope of the present invention.

What is claimed is:

1. A crosshead part for drilling pumps, the crosshead part comprising an upper guide plate, a lower guide plate and a crosshead, wherein the crosshead reciprocates in a straight line between the upper guide plate and the lower guide plate; at least one of the upper and lower guide plates has a first oil inlet for introducing external lubricating oil between the at least one of the upper and lower guide plates and an arc surface of the crosshead; mounting surfaces of the upper and lower guide plates are fixed to support ribs on a frame through bolts, and an axis of the bolts is vertical to and passes through a central line of the crosshead.

2. The crosshead part according to claim 1, wherein an oil groove is provided at one plate surface of the at least of the upper and lower guide plates which faces towards the crosshead, and the first oil inlet is communicated with the oil groove; or an oil groove is provided at the arc surface of the crosshead, and the first oil inlet is communicated with the oil groove.

3. The crosshead part according to claim 2, wherein the support ribs are evenly distributed along an axial direction of the crosshead on the frame.

4. The crosshead part according to claim 1, wherein both the upper and lower guide plates are made from vermicular cast iron, the crosshead is made from isothermal ductile iron, and a difference in hardness is formed between the upper and lower guide plates and the crosshead.

5. The crosshead part according to claim 4, wherein the support ribs are evenly distributed along an axial direction of the crosshead on the frame.

6. The crosshead part according to claim 1, wherein the crosshead part further comprises a sliding-shoe which is installed on the arc surface of the crosshead, wherein the sliding-shoe has a second oil inlet for introducing external lubricating oil between the at least one of the upper and lower guide plates and the sliding-shoe; an oil groove is provided at an external surface of the sliding-shoe, the second oil inlet is communicated with the oil groove.

7. The crosshead part according to claim 6, wherein two sliding-shoes are installed on the arc surface of the crosshead, wherein one of the sliding-shoes, which is installed on the arc surface of the crosshead, is corresponding to the upper guide plate; another of the sliding-shoes, which is installed on the arc surface of the crosshead, is corresponding to the lower guide plate.

8. The crosshead part according to claim 7, wherein the support ribs are evenly distributed along an axial direction of the crosshead on the frame.

9. The crosshead part according to claim 6, wherein the sliding-shoe is fixedly connected with the crosshead through bolts via threaded holes.

10. The crosshead part according to claim 9, wherein the sliding-shoe is fixedly connected with the crosshead through engaging a positioning groove with a positioning boss.

11. The crosshead part according to claim 6, wherein the upper and lower guide plates and the crosshead are made from isothermal ductile iron, the sliding-shoe is made from copper alloy, and there is a difference in hardness between the upper and lower guide plates and the sliding-shoe.

12. The crosshead part according to claim 6, wherein the support ribs are evenly distributed along an axial direction of the crosshead on the frame.

13. The crosshead part according to claim 1, wherein the support ribs are evenly distributed along an axial direction of the crosshead on the frame.

14. A crosshead system for drilling pumps, the crosshead system comprising a lubricating pipeline system and the crosshead part according to claim 1, wherein the lubricating pipeline system comprises a main pipeline and N branch pipelines (N is a positive integer ≥1), wherein an input end of the main pipeline is connected with an external lubricating oil supply system, one end of each of the branch pipelines is connected with the main pipeline, another end of the each of the branch pipelines is connected with the first oil inlet.

15. A drilling pump, comprising the crosshead part according to claim 1.

\* \* \* \* \*